United States Patent
Matsuura

(10) Patent No.: US 10,439,184 B2
(45) Date of Patent: Oct. 8, 2019

(54) NONAQUEOUS SECONDARY BATTERY

(71) Applicant: TOYOTA JIDOSHA KABUSHIKI KAISHA, Toyota-shi, Aichi-ken (JP)

(72) Inventor: Tomohiro Matsuura, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/207,963

(22) Filed: Jul. 12, 2016

(65) Prior Publication Data

US 2017/0018748 A1 Jan. 19, 2017

(30) Foreign Application Priority Data

Jul. 14, 2015 (JP) ................................ 2015-140527

(51) Int. Cl.
*H01M 2/12* (2006.01)
*H01M 10/0583* (2010.01)
*H01M 10/0525* (2010.01)
*H01M 2/36* (2006.01)
*H01M 2/10* (2006.01)

(52) U.S. Cl.
CPC ....... *H01M 2/1223* (2013.01); *H01M 2/1241* (2013.01); *H01M 2/1276* (2013.01); *H01M 2/365* (2013.01); *H01M 10/0525* (2013.01); *H01M 10/0583* (2013.01); *H01M 2200/20* (2013.01)

(58) Field of Classification Search
CPC combination set(s) only.
See application file for complete search history.

(56) References Cited

U.S. PATENT DOCUMENTS

| 9,147,867 | B2 * | 9/2015 | Ito | ........................... H01M 2/12 |
| 2006/0093895 | A1 | 5/2006 | Lim | |
| 2008/0107957 | A1 * | 5/2008 | Meguro | .............. H01M 2/1252 429/56 |
| 2011/0104532 | A1 * | 5/2011 | Buck | ....................... F16K 17/16 429/82 |
| 2013/0209843 | A1 | 8/2013 | Ito et al. | |
| 2013/0209844 | A1 * | 8/2013 | Gless | .................. H01M 2/1077 429/61 |

(Continued)

FOREIGN PATENT DOCUMENTS

| CN | 2155074 Y | 2/1994 |
| CN | 2322263 Y | 6/1999 |

(Continued)

OTHER PUBLICATIONS

JP2009187759 English translation. Onuma. Japan. Aug. 20, 2009. (Year: 2009).*

(Continued)

*Primary Examiner* — Christopher P Domone
(74) *Attorney, Agent, or Firm* — Sughrue Mion, PLLC

(57) ABSTRACT

A gas release valve has a valve body that is made from rubber or resin and closes a communication passage providing communication between an outside and an inside of a battery case. In an inner communication passage, which is positioned on an inner side of the battery case with respect to a valve body in the communication passage, a moisture absorber is arranged in a state where gas in the battery case is able to pass inside the inner communication passage.

6 Claims, 10 Drawing Sheets

(56) References Cited

U.S. PATENT DOCUMENTS

| | | | | |
|---|---|---|---|---|
| 2014/0079964 A1* | 3/2014 | Gless | ............... | H01M 2/1072 |
| | | | | 429/53 |
| 2014/0087247 A1* | 3/2014 | Shen | ............... | H01M 2/1205 |
| | | | | 429/185 |
| 2014/0287282 A1 | 9/2014 | Beylich et al. | | |

FOREIGN PATENT DOCUMENTS

| | | | |
|---|---|---|---|
| CN | 1346157 | A | 4/2002 |
| CN | 2658951 | Y | 11/2004 |
| CN | 103247767 | A | 8/2013 |
| DE | 10 2009 050 878 | A1 | 4/2011 |
| DE | 10 2012 202 103 | A1 | 8/2013 |
| DE | 10 2013 004 754 | A1 | 9/2014 |
| DE | 10 2013 221 760 | A1 | 5/2015 |
| JP | 06-070155 | U | 9/1994 |
| JP | 2005-123267 | A | 5/2005 |
| JP | 2006-128091 | A | 5/2006 |
| JP | 2008-204754 | A | 9/2008 |
| JP | 2009187759 | * | 8/2009 |
| JP | 2009187759 | A | 8/2009 |
| JP | 2010272264 | * | 12/2010 |

OTHER PUBLICATIONS

JP2010272264 English translation. Maeda et al. Japan Dec. 2, 2010 (Year: 2010).*

* cited by examiner

NONAQUEOUS SECONDARY BATTERY

INCORPORATION BY REFERENCE

The disclosure of Japanese Patent Application No. 2015-140527 filed on Jul. 14, 2015 including the specification, drawings and abstract is incorporated herein by reference in its entirety.

BACKGROUND OF THE INVENTION

1. Field of the Invention

The invention relates to a nonaqueous secondary battery.

2. Description of Related Art

Japanese Patent Application Publication No. 2006-128091 (JP 2006-128091 A) discloses a nonaqueous secondary battery (specifically, a lithium-ion secondary battery) described below. Specifically, a secondary battery is disclosed, which is provided with an electrode body having a positive electrode, a negative electrode, and a separator, a battery case that houses the electrode body, and a one-way valve provided in a wall part of the battery case. The one-way valve is a valve that communicates with inside of the battery case and allows gas to flow from inside to outside of the battery case. Specifically, the one-way valve is configured as follows. In a case where internal pressure of the battery case is lower than a given value, a communication passage that allows outside and inside of the battery case to communicate with each other is kept closed by a valve body, and, when internal pressure of the battery case reaches the given value, the valve body releases the closed state of the communication passage, thereby discharging gas in the battery case outside through the communication passage. Thereafter, the communication passage is closed again by the valve body.

JP 2006-128091 A describes that the valve body is formed from rubber or resin. In the case where the valve body is formed from rubber or resin, even when the valve body closes the communication passage, moisture outside the battery case (for example, in the atmosphere) could permeate the valve body and enter the battery case. Thus, performance of the nonaqueous secondary battery could be deteriorated.

SUMMARY OF THE INVENTION

The invention provides a nonaqueous secondary battery provided with a gas release valve, the nonaqueous secondary battery being able to restrain moisture outside a battery case from entering the battery case even when the moisture permeates a valve body.

A first aspect of the invention relates to a nonaqueous secondary battery including an electrode body having a positive electrode and a negative electrode, and a battery case housing the electrode body. The nonaqueous secondary battery is provided with a gas release valve provided in a wall part of the battery case, and a safety valve that is provided in the wall part of the battery case, tears open and releases gas in the battery case outside when internal pressure of the battery case is a first pressure value or larger. The gas release valve has a valve body, which is made from rubber or resin and closes a communication passage providing communication between an inside and an outside of the battery case. The gas release valve is configured so as to maintain the communication passage in a state of being closed by the valve body when internal pressure of the battery case is smaller than a second pressure value that is smaller than the first pressure value, release the state of the communication passage closed by the valve body and discharge gas in the battery case outside through the communication passage when internal pressure of the battery case becomes the second pressure value or larger, and make the communication passage closed by the valve body again when internal pressure of the battery case becomes smaller than the second pressure value thereafter. A moisture absorber is arranged inside an inner communication passage in a state where gas in the battery case is able to pass through the inner communication passage, the inner communication passage being positioned in the communication passage on an inner side of the battery case with respect to the valve body.

The foregoing nonaqueous secondary battery includes the gas release valve provided in the wall part of the battery case. The gas release valve has a valve body that is made from rubber or resin and closes the communication passage providing communication between an outside and an inside of the battery case. Conventionally, in such a nonaqueous secondary battery, moisture outside the battery case (for example, in the atmosphere) could permeate the valve body and enter the battery case even when the communication passage is closed by the valve body as stated above.

However, in the foregoing nonaqueous secondary battery, the moisture absorber is arranged inside the inner communication passage positioned on the inner side of the battery case with respect to the valve body in the communication passage. Hence, even when moisture outside of the battery case (for example, in the atmosphere) permeates the valve body and enters the inner communication passage, the moisture absorber is able to absorb permeating moisture. Thus, it is possible to restrain moisture that has permeated the valve body from entering the battery case. The moisture absorber is a member that is able to hold moisture inside of itself, and may be formed by, for example, zeolite, silica gel, or activated alumina.

Incidentally, the foregoing gas release valve has the following structure. In a case where internal pressure of the battery case is smaller than the second pressure value, the communication passage is maintained closed by the valve body, and, when internal pressure of the battery case reaches the second pressure value, the communication passage is released from the state of being closed by the valve body (the valve opens), gas in the battery case is discharged outside through the communication passage, and then the communication passage is closed again by the valve body. In the gas release valve having such a structure, in a case where a large amount of gas is generated inside the battery case due to some kind of abnormal state, and an abnormal pressure rise (for example, a sudden rise of internal pressure) happens inside the battery case, gas inside the battery case could not be discharged outside appropriately to ensure safety.

However, in the foregoing nonaqueous secondary battery, in addition to the foregoing gas release valve, the following safety valve is provided. Specifically, the foregoing nonaqueous secondary battery is provided with the safety valve, which is provided in the wall part of the battery case, the safety valve tearing open when internal pressure of the battery case reaches the first pressure value (a pressure value higher than the second pressure value with which the gas release valve opens), thus releasing gas in the battery case outside. Thus, with the safety valve configured to tear open, it is possible to continuously maintain the safety valve torn open after the safety valve tears open.

Therefore, in the case where internal pressure of the battery case reaches the first pressure value because a large amount of gas is generated inside the battery case due to some kind of abnormal state, and an abnormal pressure rise (for example, a sudden rise of internal pressure) happens inside the battery case, the safety valve tears open, and gas in the battery case is released outside swiftly through a hole made in the safety valve due to the tear open, thereby ensuring safety.

The gas release valve may be inserted into a liquid injection hole passing through the wall part of the battery case, and may close the liquid injection hole.

In the above-mentioned nonaqueous secondary battery, the gas release valve closes the liquid injection hole. Therefore, compared to a case where a closing member for closing the liquid injection hole is prepared separately, it is possible to reduce the number of components, and cost is thus reduced. Since it is not necessary to provide a through-hole for inserting the gas release valve in addition to the liquid injection hole, cost is low. Moreover, compared to the case where the through-hole for inserting the gas release valve is provided in addition to the liquid injection hole, it is possible to increase rigidity of the battery case.

At least a part of the moisture absorber may be a porous body.

In the above-mentioned nonaqueous secondary battery, the porous moisture absorber made from the porous body is used as the moisture absorber. Therefore, gas inside the battery case is able to pass through the inner communication passage through an internal space of the porous moisture absorber. Therefore, in the foregoing nonaqueous secondary battery, even though the moisture absorber is arranged inside the inner communication passage, it is possible to appropriately discharge gas in the battery case outside through the communication passage in the case where internal pressure of the battery case reaches the second pressure value. By forming the moisture absorber (the porous moisture absorber) integrally by a porous body, the shape of the moisture absorber becomes stable. Such a porous moisture absorber is easily handled, and is easily arranged inside the inner communication passage.

At least a part of the moisture absorber may be a plurality of granule moisture absorbers.

In the above-mentioned nonaqueous secondary battery, the granular (for example, spherical) moisture absorbers are used as the moisture absorber. The plurality of granule moisture absorbers is arranged inside the inner communication passage. To be more specific, the plurality of granule moisture absorbers is arranged inside the inner communication passage so that gas in the battery case is able to pass through the inner communication passage through a gap between neighboring granule moisture absorbers. Therefore, in the foregoing nonaqueous secondary battery, even though the moisture absorbers are arranged inside the inner communication passage, it is possible to appropriately discharge gas in the battery case outside through the communication passage in the case where internal pressure of the battery case reaches the second pressure value. In the foregoing nonaqueous secondary battery, by adjusting grain size and grain size distribution of the granule moisture absorbers arranged inside the inner communication passage, it is possible to easily adjust a size (a sectional area) of a gas flow passage for gas in the battery case to go through inside the inner communication passage. By using the granular shaped granule moisture absorbers as the moisture absorber, special molding for arranging the moisture absorber inside inner communication passage is not necessary, thereby restraining an increase in manufacturing cost.

At least a part of the moisture absorber may be a moisture absorber in which a sheet-shaped moisture absorber is wound.

In the above-mentioned nonaqueous secondary battery, the moisture absorber, in which the sheet-shaped moisture absorber is wound, is used as the moisture absorber. This moisture absorber forms a shape that allows gas in the battery case to pass through inside of the inner communication passage through a gap between portions of the moisture absorber, which are adjacent to each other in the radial direction (a direction orthogonal to the winding direction). Therefore, in the foregoing nonaqueous secondary battery, even though the moisture absorber is arranged inside the inner communication passage, it is possible to appropriately discharge gas in the battery case outside through the communication passage in the case where internal pressure of the battery case reaches the second pressure value. By changing the number of winding and so on of the moisture absorber, it is possible to adjust the diameter of the moisture absorber. Therefore, it is possible to adjust the moisture absorber to an appropriate size (diameter) easily in accordance with the diameter of the inner communication passage.

A second aspect of the invention relates to a nonaqueous secondary battery comprising: an electrode body having a positive electrode and a negative electrode; a battery case housing the electrode body; a safety valve provided in a wall part of the battery case, the safety valve tearing open when internal pressure of the battery case is a first pressure value or larger and releasing gas in the battery case outside; and a gas release valve including (i) a valve body that is made from rubber or resin and closes a communication passage providing communication between an outside and an inside of the battery case, (ii) a moisture absorber that is arranged inside an inner communication passage and has a gas permeability, and (iii) an elastic body that urges a second pressure value that is smaller than the first pressure value with respect to the valve body in a direction from an outside to an inside of the battery case.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

DETAILED DESCRIPTION OF EMBODIMENTS (Embodiment) Next, an embodiment of the invention is explained with reference to the drawings. FIG. 1 is a perspective view of a nonaqueous secondary battery 1 according to the embodiment. FIG. 2 is a longitudinal sectional view of the nonaqueous secondary battery 1.

As shown in FIG. 1, the nonaqueous secondary battery 1 according to this embodiment is a lithium-ion secondary battery having a rectangular parallelepiped shape. As shown in FIG. 2, the nonaqueous secondary battery 1 is provided with a battery case 10 having a rectangular parallelepiped shape, and an electrode body 50 housed inside the battery case 10. The battery case 10 is provided with a rectangular box-shaped case body 11 having an opening 11d, and a lid member 13 that closes the opening 11d of the case body 11. The case body 11 and the lid member 13 are integrated with each other by all-around welding. Both the case body 11 and the lid member 13 are made from aluminum.

Figure 1:
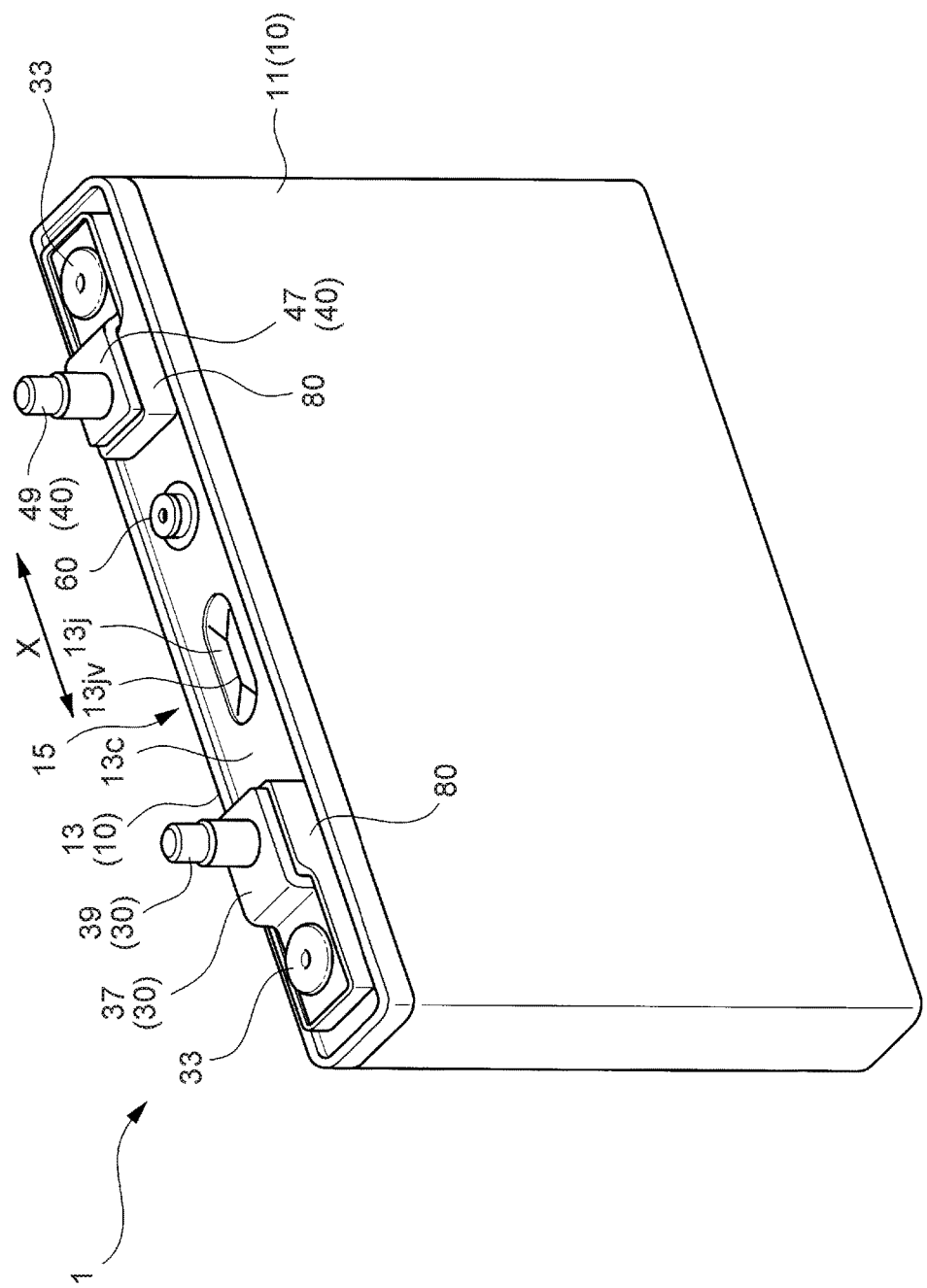
FIG. 1 is a perspective view of a nonaqueous secondary battery according to an embodiment.

The electrode body 50 is a flat-type wound body that has an elliptical sectional shape and is made by arranging a separator 57 between sheet-shaped positive electrode 55 and negative electrode 56 and then winding the separator 57, the positive electrode 55 and the negative electrode 56. The electrode body 50 has a positive electrode wound part 55b and a negative electrode wound part 56b. The positive electrode wound part 55b is positioned in one end part (the left end part in FIG. 2) in the axis direction (the horizontal direction in FIG. 2) of the electrode body 50, in which only a part of the positive electrode 55 overlaps like a spiral. The negative electrode wound part 56b is positioned in the other end part (the right end part in FIG. 2), in which only a part of the negative electrode 56 overlaps like a spiral. In a portion of the positive electrode 55 excluding the positive electrode wound part 55b, a positive electrode composite layer containing a positive electrode active material is formed. Similarly, in a portion of the negative electrode 56 excluding the negative electrode wound part 56b, a negative electrode composite layer containing a negative electrode active material is formed.

The lid member 13 has a narrow planar shape, and, in both end parts in the longitudinal direction X (the horizontal direction in FIG. 1) of the lid member 13, circular through-holes (lid penetrating holes) 13h, 13k extending through the lid member 13 are formed. The lid member 13 structures a lid assembly 15 by being combined with other members described later. The lid assembly 15 has first insulating members 80, a positive electrode terminal member 30, a negative electrode terminal member 40, and second insulating members 70, in addition to the lid member 13.

Figure 2:
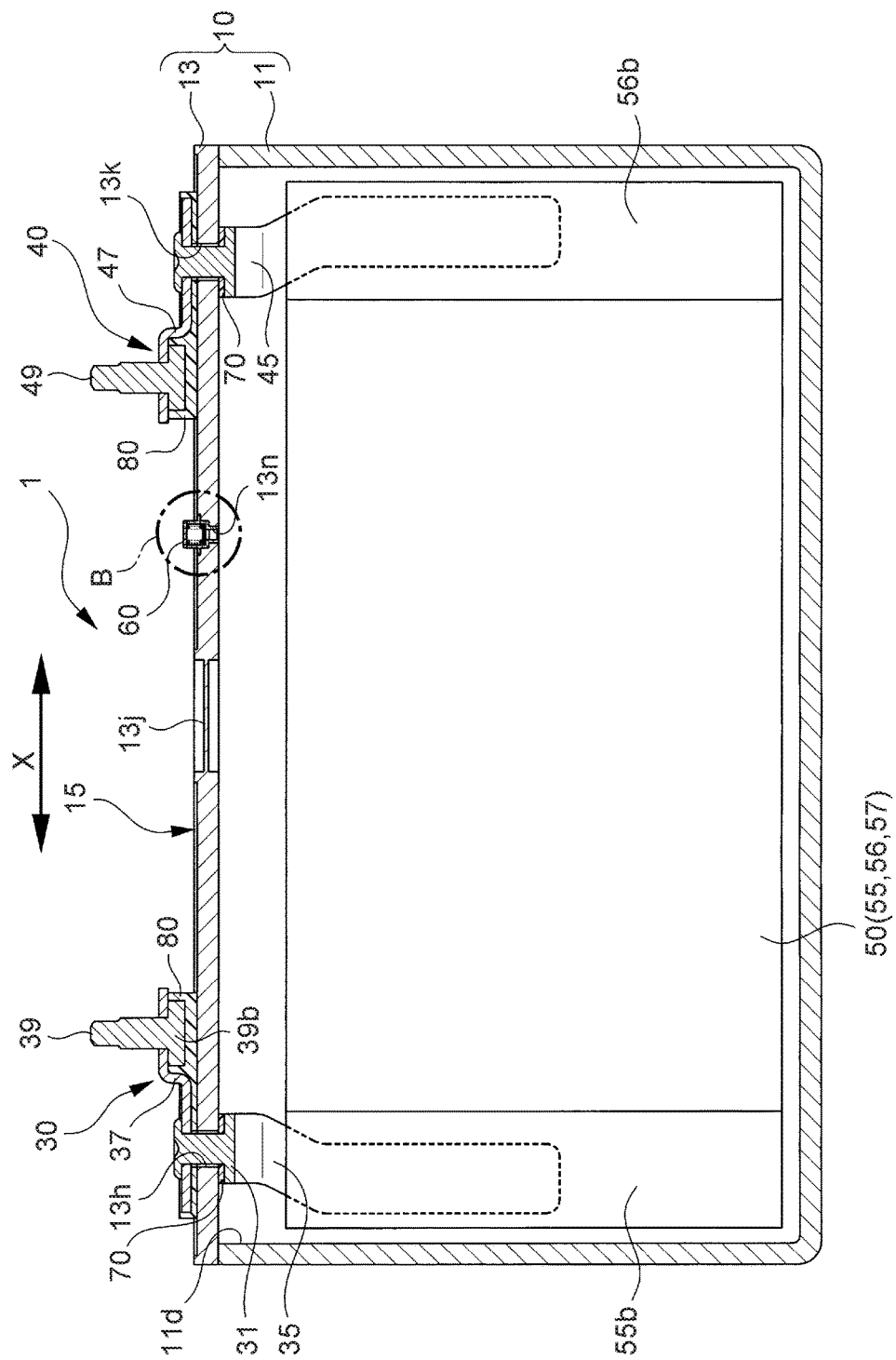
FIG. 2 is a sectional view of the nonaqueous secondary battery according to the embodiment.

The positive electrode terminal member 30 is structured from a positive electrode connecting member 35, a positive electrode external terminal 37, and a positive electrode fastening member 39 (see FIG. 2). Among them, the positive electrode connecting member 35 is made from metal, is connected with the positive electrode wound part 55b of the electrode body 50, and extends outside through the through-hole 13h of the lid member 13. The positive electrode external terminal 37 is made from metal, is positioned above the lid member 13 (outside the battery case 10), and is electrically connected with the positive electrode connecting member 35 outside the battery case 10. The positive electrode fastening member 39 is a metallic bolt, is positioned outside the battery case 10, and fastens the positive electrode external terminal 37 to a bus bar (not shown).

The negative electrode terminal member 40 is structured from a negative electrode connecting member 45, a negative electrode external terminal 47, and a negative electrode fastening member 49 (see FIG. 2). Among them, the negative electrode connecting member 45 is made from metal, is connected with the negative electrode wound part 56b of the electrode body 50, and extends outside through the through-hole 13k of the lid member 13. The negative electrode external terminal 47 is made from metal, is positioned above the lid member 13 (outside the battery case 10), and is electrically connected with the negative electrode connecting member 45 outside the battery case 10. The negative electrode fastening member 49 is a metallic bolt, is positioned above the lid member 13 (outside the battery case 10), and fastens the negative electrode external terminal 47 to a bus bar (not shown).

Further, a safety valve 13j is provided in a center part of the lid member 13 (corresponding to a wall part of the battery case 10) in the longitudinal direction X. The safety valve 13j is formed to be thinner than the rest of the lid member 13, and a groove part 13jv is formed on an upper surface of the safety valve 13j (see FIG. 1). Thus, for example, in a case where a large amount of gas is generated inside the battery case 10 due to some kind of abnormal state, an abnormal pressure rise (for example a sudden rise of internal pressure) happens inside the battery case 10, and internal pressure of the battery case 10 reaches the first pressure value, the groove part 13jv of the safety valve 13j raptures, thus making the safety valve 13j tear open. Therefore, it is possible to release gas in the battery case 10 outside. Hence, deformation, excessive temperature rise and so on of the nonaqueous secondary battery 1 are restrained, thereby ensuring safety.

Figure 3:
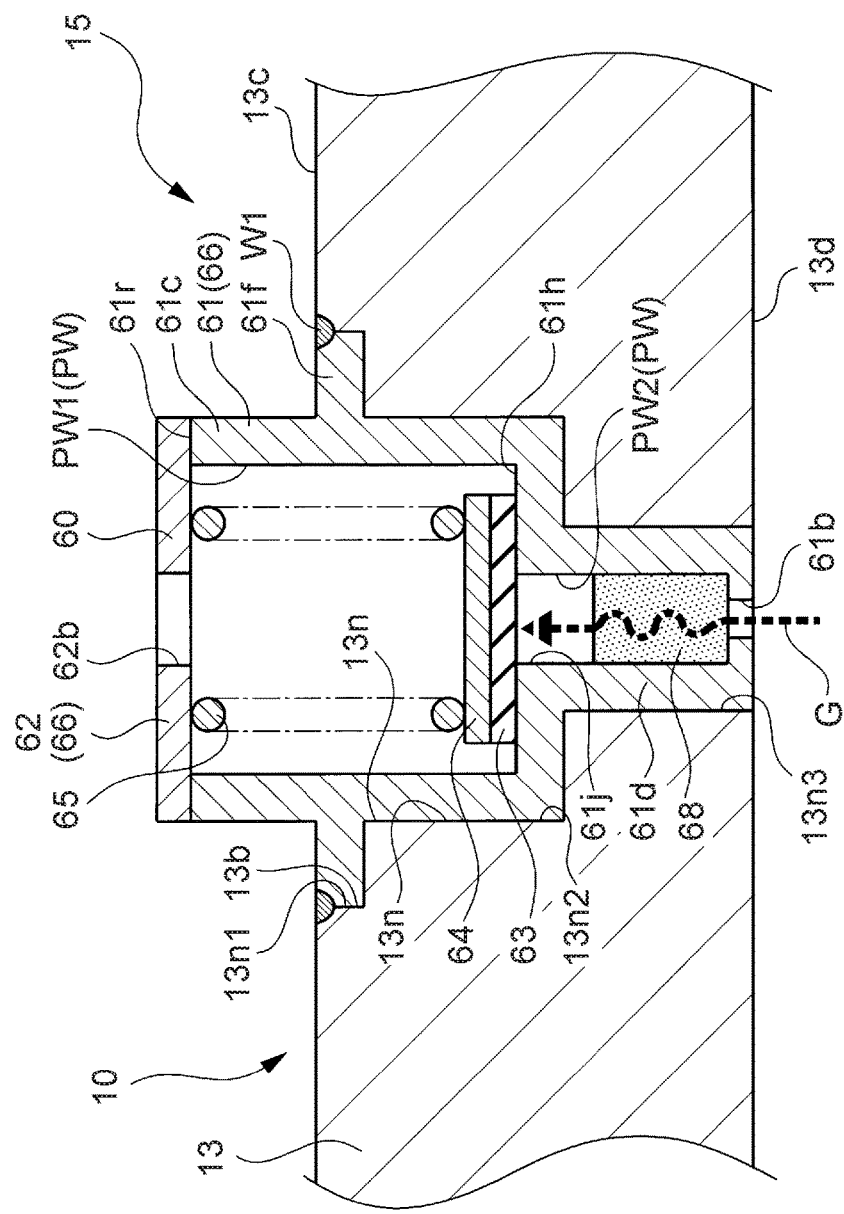
FIG. 3 is an enlarged view of section B in FIG. 2.

As shown in FIG. 2, in the lid member 13, a liquid injection hole 13n is formed between the safety valve 13j and the through-hole 13k. The liquid injection hole 13n extends through the lid member 13 (corresponding to the wall part of the battery case 10) in the thickness direction. The liquid injection hole 13n is a hole for injecting nonaqueous electrolytic solution (not shown) into the case body 11. As shown in FIG. 3, the liquid injection hole 13n has a cylinder shape in which three cylindrical holes having different inner diameters are joined to each other in the axis direction (the vertical direction in FIG. 3). Specifically, the liquid injection hole 13n has a cylindrical large diameter part 13n1 positioned on an outer surface 13c side of the lid member 13, a cylindrical small diameter part 13n3 positioned on an inner surface 13d side, and a columnar intermediate diameter part 13n2 positioned between the large diameter part 13n1 and the small diameter part 13n3. These holes are arranged in the descending order of the inner diameter as follows: the larger diameter part 13n1, the intermediate diameter part 13n2, and the small diameter part 13n3.

A gas release valve 60 is inserted inside the liquid injection hole 13n of the lid member 13 (see FIG. 2 and FIG. 3). The gas release valve 60 has a cylindrical housing 66, and a valve body 63, a valve body pressing plate 64, and a coil spring 65 arranged inside the housing 66. The housing 66 has a cylindrical housing body 61, and a disc-shaped (annular-shaped) pressing member 62. The pressing member 62 is arranged on an upper end surface 61r of the housing body 61, and presses the coil spring 65 so that the coil spring 65 is elastically compressed. The pressing member 62 and the housing body 61 are integrated with each other by welding.

The housing body 61 has a shape in which two cylindrical portions having different inner diameters are joined to each other in the axis direction (that coincides with the thickness direction of the lid member 13, or the vertical direction in FIG. 3). Specifically, the housing body 61 has a cylindrical large diameter part 61c positioned on the outer surface 13c side of the lid member 13, and a cylindrical small diameter part 61d positioned on the inner surface 13d side. These portions are arranged in the descending order of the inner diameter as follows: the large diameter part 61c and the small diameter part 61d. An annular rib part 61f is provided in an outer peripheral surface of the large diameter part 61c.

The gas release valve 60 having the housing 66 in the above-mentioned shape is inserted into the liquid injection hole 13n of the lid member 13 in a form where the small diameter part 61d of the housing body 61 is fitted to the small diameter part 13n3 of the liquid injection hole 13n, the large diameter part 61c of the housing body 61 is fitted to the intermediate diameter part 13n2 of the liquid injection hole 13n, and the rib part 61f of the housing body 61 is fitted to the large diameter part 13n1 of the liquid injection hole 13n (see FIG. 3). Thus, the liquid injection hole 13n is closed.

As stated above, in this embodiment, the gas release valve 60 is inserted into the liquid injection hole 13n, thereby closing the liquid injection hole 13n. Therefore, compared to a case where a closing member that closes the liquid injection hole 13n is prepared separately, the number of components is reduced, and cost is thus low. Further, since it is not necessary to provide a through-hole separately for inserting the gas release valve 60, in addition to the liquid injection hole 13n, cost is low. Furthermore, compared to a case where a through-hole for inserting the gas release valve 60 is provided separately in addition to the liquid injection hole 13n, it is possible to increase rigidity of the battery case.

Moreover, in this embodiment, the rib part 61f of the housing body 61 of the gas release valve 60, and a wall part 13b of the lid member 13, which forms the large diameter part 13n1 of the liquid injection hole 13n, are welded all around (butt welding) by laser welding. Because of this, a welded part W1 seals a gap between the rib part 61f of the housing body 61 and the wall part 13b of the lid member 13, which forms the large diameter part 13n1 of the liquid injection hole 13n. In this way, the liquid injection hole 13n of the lid member 13 is sealed.

The gas release valve 60 is explained in detail. The housing 66 of the gas release valve 60 is made from aluminum, and forms a communication passage PW that allows outside and inside the battery case 10 to communicate with each other (see FIG. 3). The communication passage PW is a path from an air vent hole 61b (a through-hole) formed in a bottom part of the small diameter part 61d of the housing body 61 to an air vent hole 62b (a through-hole extending through the pressing member 62 in the thickness direction) formed in the pressing member 62, and is an air vent passage communicating from inside to outside of the battery case 10.

Inside the large diameter part 61c of the housing body 61 in the housing 66, the disc-shaped valve body 63 made from rubber, the disc-shaped valve body pressing plate 64 made from aluminum, and the coil spring 65 are arranged. Specifically, the valve body 63 is arranged on a bottom part 61h of the large diameter part 61c of the housing body 61 in a form where the valve body 63 closes the communication passage PW. A through-hole 61j is formed in the center of the bottom part 61h, extending through the bottom part 61h in the thickness direction. Therefore, the valve body 63 closes the communication passage PW in a form where the valve body 63 closes the through-hole 61j of the bottom part 61h of the large diameter part 61c.

In the communication passage PW, a portion positioned on an inner side (a lower side in FIG. 3) of the battery case 10 with respect to the valve body 63 is referred to as an inner communication passage PW2, and a portion positioned on an outer side (an upper side in FIG. 3) of the battery case 10 with respect to the inner communication passage PW2 is referred to as an outer communication passage PW1. Hence, the valve body 63 closes the communication passage PW in a form where the valve body 63 closes the boundary between the inner communication passage PW2 and the outer communication passage PW1.

The valve body pressing plate 64 is joined to the upper surface of the valve body 63. Further, the coil spring 65 is arranged between the valve body pressing plate 64 and the pressing member 62 in a state where the coil spring 65 itself is elastically compressed. Therefore, the valve body 63 is pressed by elastic restoring force of the coil spring 65 towards the bottom part 61h of the large diameter part 61c of the housing body 61, and is in close contact with the bottom part 61h of the large diameter part 61c so as to be able to be separated, in a form where the valve body 63 closes the through-hole 61j of the bottom part 61h of the large diameter part 61c.

In a case where internal pressure of the battery case 10 is smaller than a second pressure value (a value smaller than the first pressure value), the gas release valve 60 stated above maintains the communication passage PW closed by the valve body 63 as shown in FIG. 3. Specifically, in the case where internal pressure of the battery case 10 is smaller than the second pressure value, the through-hole 61j of the bottom part 61h of the large diameter part 61c of the housing body 61 is maintained closed by the valve body 63.

Figure 4:
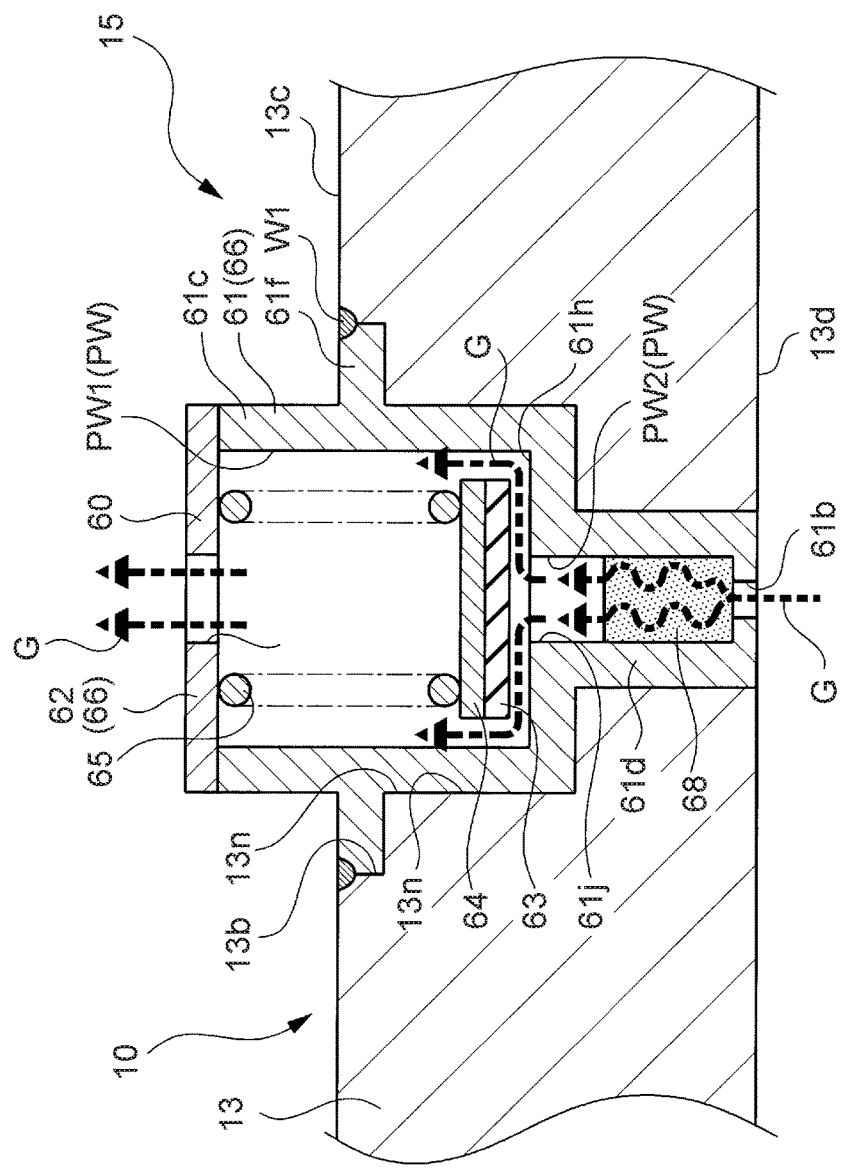
FIG. 4 is a view explaining an operation of a gas release valve.

When internal pressure of the battery case 10 reaches the second pressure value, the state of the communication passage PW closed by the valve body 63 is released, and gas G in the battery case 10 is discharged outside through the communication passage PW. Specifically, as shown in FIG. 4, when internal pressure of the battery case 10 reaches the second pressure value, force of the gas G inside the battery case 10 for pushing the valve body 63 upwardly exceeds force of the coil spring 65 for pressing the valve body 63 downwardly, and the coil spring 65 is elastically compressed further. Thus, the valve body 63 moves up, and the valve body 63 is separated from the bottom part 61h of the large diameter part 61c. Therefore, as shown by arrows in FIG. 4, the communication passage PW (to be in detail, the through-hole 61j of the bottom part 61h) is opened, and the gas G in the battery case 10 is discharged outside the nonaqueous secondary battery 1 from the air vent hole 62b of the pressing member 62 through the communication passage PW.

After the gas release valve 60 discharges gas G outside as stated above, the gas release valve 60 closes the communication passage PW by using the valve body 63. Specifically, by discharging the gas G outside, internal pressure of the battery case 10 (force for pressing the valve body 63) is decreased. Therefore, force of the coil spring 65 for pressing the valve body 63 downwardly exceeds force of the gas G inside the battery case 10 for pressing the valve body 63 upwardly, and the coil spring 65 elastically extends (is restored), thus lowering the valve body 63, and the valve body 63 comes into close contact with the bottom part 61h of the large diameter part 61c. Thus, the through-hole 61j of the bottom part 61h of the large diameter part 61c is closed by the valve body 63, and the communication passage PW is closed. In this way, in the nonaqueous secondary battery 1 according to this embodiment, internal pressure of the battery case 10 is normally maintained smaller than the second pressure value.

Conventionally, in a nonaqueous secondary battery in which rubber or resin is used as a material of a valve body, there has been a possibility that moisture outside a battery case (for example, in the atmosphere) could permeate a valve body and enters the battery case even when a communication passage is closed by the valve body.

On the contrary, in the nonaqueous secondary battery 1 according to this embodiment, a porous moisture absorber 68 is arranged inside the inner communication passage PW2 that is positioned on the inner side of the battery case 10 with respect to the valve body 63 in the communication passage PW, in a state where gas G inside the battery case 10 is able to pass through the inner communication passage PW2. Specifically, as shown in FIG. 3, the columnar porous moisture absorber 68 is inserted inside the small diameter part 61d of the housing body 61. Therefore, in this embodiment, the porous moisture absorber 68 is arranged inside the gas release valve 60.

Because of this, even when moisture outside the battery case 10 (for example, in the atmosphere) permeates the valve body 63 and enters the inner communication passage PW2, the porous moisture absorber 68 is able to absorb the permeating moisture. Thus, in the nonaqueous secondary battery according to this embodiment, it is possible to restrain moisture permeating through the valve body 63 from entering the battery case 10.

The porous moisture absorber 68 is made from a columnar porous body (specifically, a porous body that is zeolite formed into a columnar shape), and has an internal space that structures the air vent passage extending through inside of the porous moisture absorber 68 itself. Therefore, as shown by the arrow in FIG. 3, gas G inside the battery case 10 is able to pass inside the inner communication passage PW2 through the internal space of the porous moisture absorber 68. Hence, in the nonaqueous secondary battery 1 according to this embodiment, even when the porous moisture absorber 68 is arranged inside the inner communication passage PW2, the gas release valve 60 operates (opens) in the case where internal pressure of the battery case 10 reaches the second pressure value. Thus, it is possible to appropriately discharge gas in the battery case 10 outside through the communication passage PW.

Next, a manufacturing method for the nonaqueous secondary battery 1 according to this embodiment is explained. First of all, the lid assembly 15 having the lid member 13, the first insulating member 80, the positive electrode terminal member 30, the negative electrode terminal member 40, and the second insulating member 70 is prepared (see FIG. 1 and FIG. 2). At this time, the liquid injection hole 13n of the lid member 13 is not closed by the gas release valve 60 (the gas release valve 60 is not inserted into the liquid injection hole 13n). Further, the separator 57 is arranged between the sheet-shaped positive electrode 55 and negative electrode 56, and the flat wound-type electrode body 50 is fabricated by winding the positive electrode 55, the negative electrode 56, and the separator 57.

Next, the positive electrode connecting member 35 of the positive electrode terminal member 30 is welded to the positive electrode wound part 55b of the electrode body 50. Further, the negative electrode connecting member 45 of the negative electrode terminal member 40 is welded to the negative electrode wound part 56b of the electrode body 50. Because of this, the positive electrode terminal member 30 and the positive electrode 55 are electrically connected with each other, and, the negative electrode terminal member 40 and the negative electrode 56 are electrically connected with each other, and the lid assembly 15 and the electrode body 50 are integrated with each other.

Next, the opening 11d of the case body 11 is closed by the lid member 13 while housing the electrode body 50 inside the case body 11. In this state, the lid member 13 and the case body 11 are joined to each other by all-around welding. Thereafter, the non-aqueous electrolytic solution (not shown) is injected into the case body 11 through the liquid injection hole 13n of the lid member 13, and inside of the electrode body 50 is impregnated with the non-aqueous electrolytic solution. Next, the gas release valve 60 is inserted into the liquid injection hole 13n of the lid member 13, and the gas release valve 60 closes the liquid injection hole 13n (see FIG. 3). Thereafter, the rib part 61f of the housing body 61 of the gas release valve 60 and the wall part 13b of the lid member 13, which forms the large diameter part 13n1 of the liquid injection hole 13n, are welded all around (butt welding) by laser welding. Thereafter, by performing given processing, the nonaqueous secondary battery 1 (see FIG. 1, an FIG. 2) according to this embodiment is completed.

Figure 5:
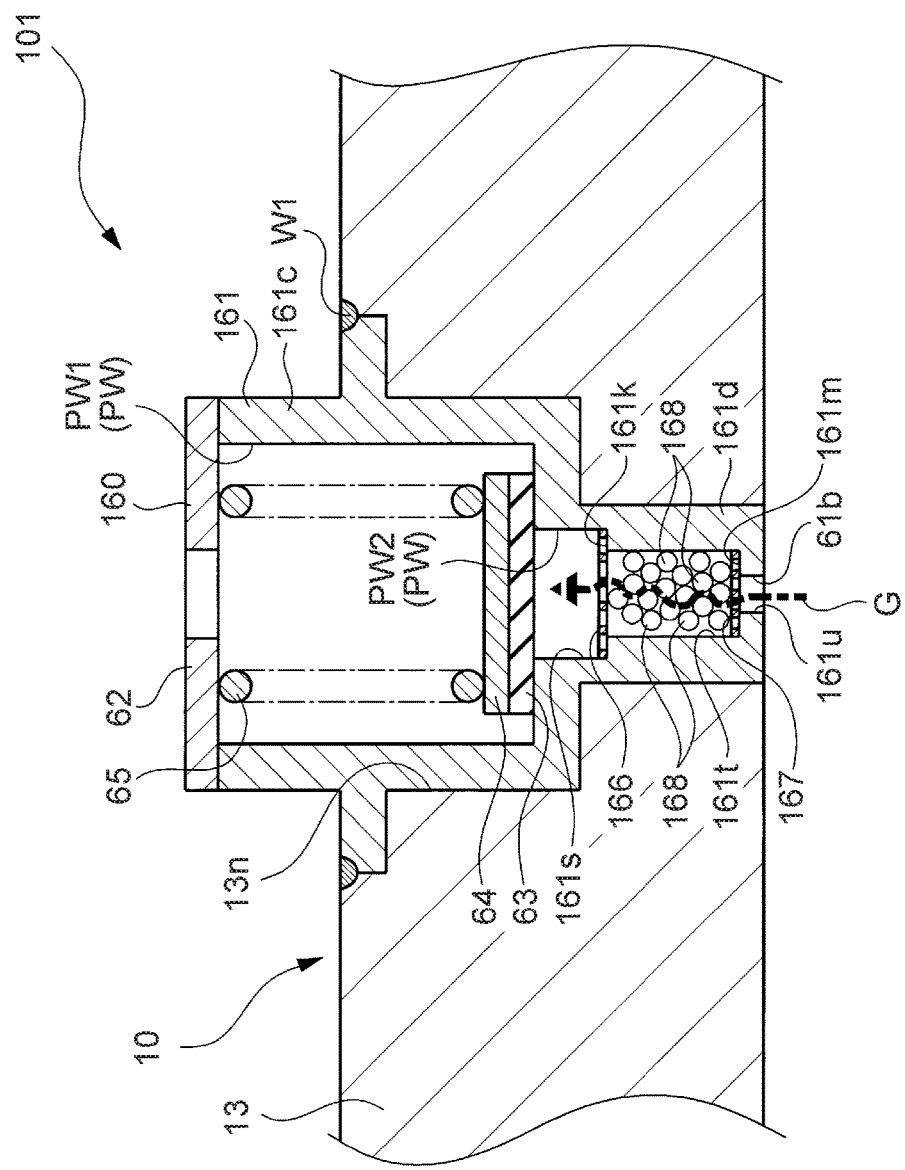
FIG. 5 is a sectional view of a gas release valve according to the first modified example.

(First modified example) Next, the first modified example of the invention is explained with reference to the drawings. The nonaqueous secondary battery 101 of the first modified example has a different form of a moisture absorber of a gas release valve from that of the nonaqueous secondary battery 1 according to the embodiment, and the rest of the parts are the same. Therefore, the part that is different form the embodiment is explained here. FIG. 5 is a longitudinal sectional view of a gas release valve 160 according to the first modified example.

In the first modified example, a granule moisture absorber 168 having a granular shape (specifically, a spherical shape) is used as the moisture absorber (see FIG. 5). The granule moisture absorber 168 is made by forming zeolite into a granular shape (a spherical shape). The plurality of granule moisture absorbers 168 is arranged inside an inner communication passage PW2 (a small diameter part 161d of a housing body 161).

Specifically, as shown in FIG. 5, an inner surface of the small diameter part 161d of the housing body 161 has a shape in which three cylindrical inner peripheral surfaces having different inner diameters (a large diameter part 161s, an intermediate diameter part 161t, and a small diameter part 161u) are lined up in an axis direction.

Specifically, the inner surface of the small diameter part 161d is structured from a large diameter part 161s, an intermediate diameter part 161t, and a small diameter part 161u that have cylinder shapes and are arranged in order from the valve body 63 side, an annular first connecting part 161k that connects the large diameter part 161s and the intermediate diameter part 161t with each other, and an annular second connecting part 161m that connects the intermediate diameter part 161t and the small diameter part 161u with each other. The first connecting part 161k and the second connecting part 161m are separated from each other in a direction in which the inner communication passage PW2 extends (the vertical direction in FIG. 5).

A circular wire netting 166, which has a larger diameter than an inner diameter of the intermediate diameter part 161t, is fixed onto the first connecting part 161k in the boundary between the large diameter part 161s and the intermediate diameter part 161t so as to divide the inner communication passage PW2. Also, a circular wire netting 167, which has a larger diameter of the inner diameter of the small diameter part 161u, is fixed onto the second connecting part 161m in the boundary between the intermediate diameter part 161t and the small diameter part 161u so as to divide the inner communication passage PW2. Mesh dimensions (hole dimensions) of the wire nettings 166, 167 are large enough for gas G inside a battery case 10 to pass through, and are smaller than a diameter of a granule moisture absorber 168.

Then, the plurality of granule moisture absorbers 168 is arranged in a space between the wire nettings 166 and 167 in the inner communication passage PW2 (an internal space of the small diameter part 161d of the housing body 161) (see FIG. 5). Because of this, even when moisture outside the battery case 10 (for example, in the atmosphere) permeates the valve body 63 and enters the inner communication passage PW2, the granule moisture absorbers 168 are able to absorb the permeating moisture. Therefore, in the nonaqueous secondary battery 101 according to the first modified example, moisture that permeates the valve body 63 is restrained from entering the battery case 10.

As shown in FIG. 5, the plurality of granule moisture absorbers 168 is arranged so that gas G inside the battery case 10 is able to pass inside the inner communication passage PW2 through a gap between neighboring granule moisture absorbers 168 and a gap between the inner surface of the small diameter part 161d and neighboring granule moisture absorbers 168. Therefore, in the nonaqueous secondary battery 101 according to the first modified example, even when the porous moisture absorbers 68 are arranged inside the inner communication passage PW2, in the case where internal pressure of the battery case 10 reaches the second pressure value, the gas release valve 60 operates (opens) and is able to appropriately discharge gas in the battery case 10 outside through the communication passage PW.

Figure 6:
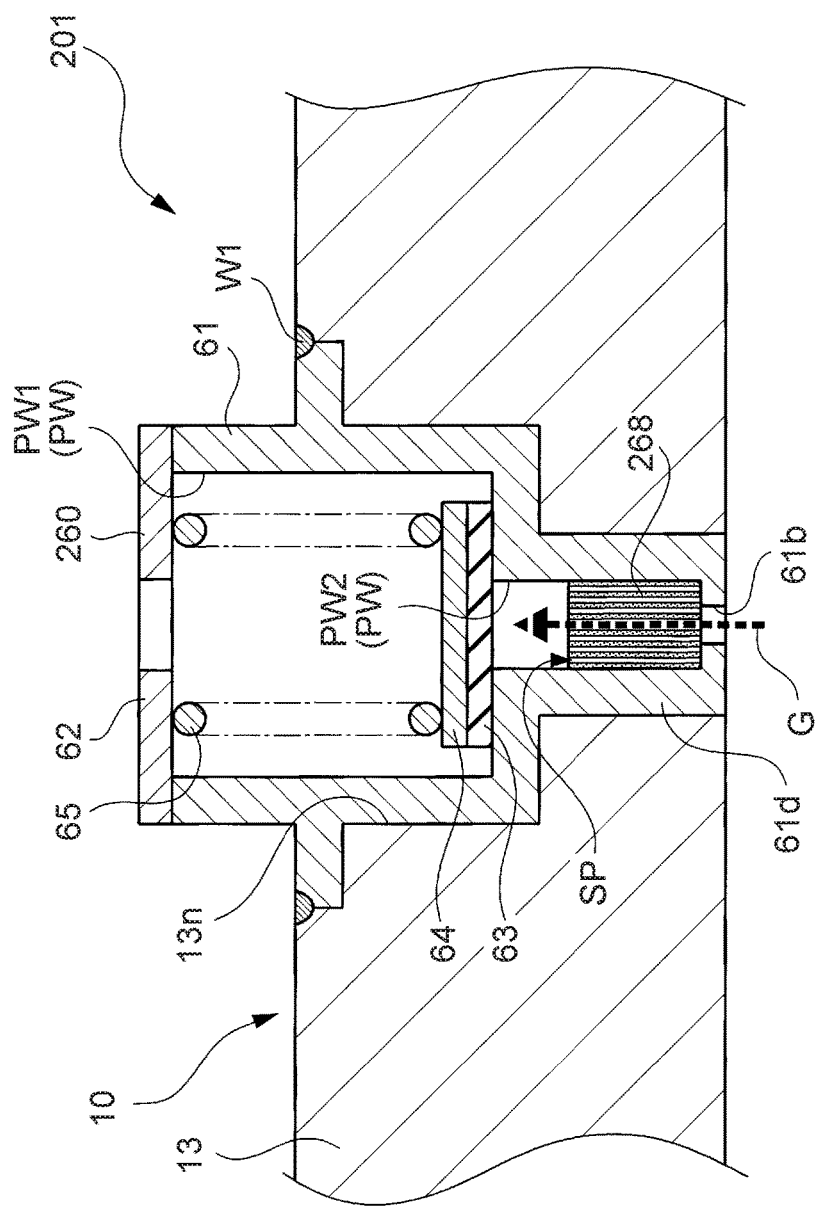
FIG. 6 is a sectional view of a gas release valve according to the second modified example.
Figure 7:
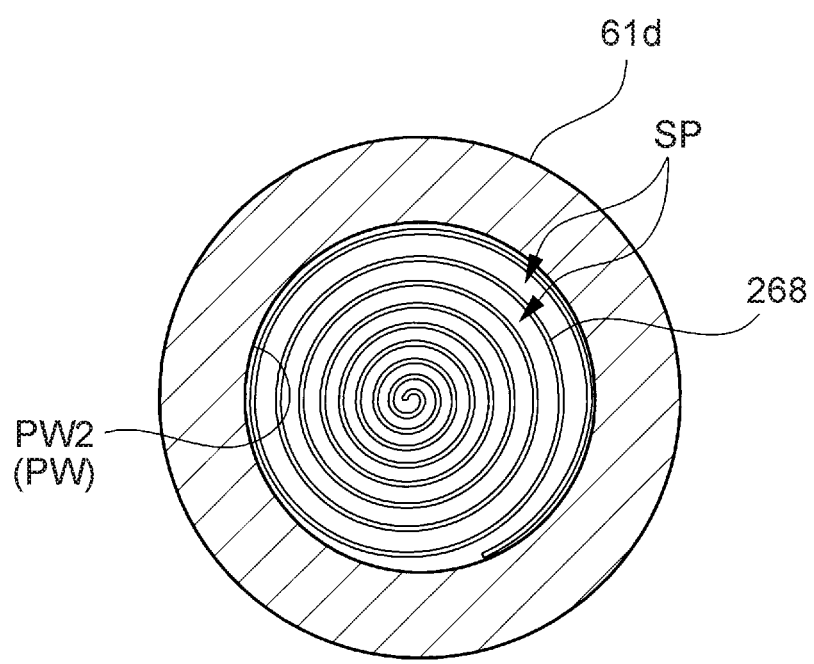
FIG. 7 is a sectional view of an inner communication passage in which a wound-type moisture absorber is arranged according to the second modified example.

(Second modified example) Next, the second modified example according to the invention is explained with reference to the drawings. In a nonaqueous secondary battery 201 according to the second modified example, a form of a moisture absorber of a gas release valve is different from that of the nonaqueous secondary battery 1 according to the embodiment, and the rest of the parts are the same. Therefore, a part different from that of the embodiment is explained here. FIG. 6 is a longitudinal sectional view of a gas release valve 260 according to the second modified example. FIG. 7 is a transverse sectional view (a sectional view taken in a direction orthogonal to the direction in which the section in FIG. 6 is taken) of an inner communication passage PW2 in which a wound-type moisture absorber 268 according to the second modified example is arranged.

In the second modified example, the wound-type moisture absorber 268, which is made by winding a sheet-shaped moisture absorber (for example, a moisture absorber in which a layer containing silica gel is formed on a surface of a sheet-shaped base material), is used as the moisture absorber. Then, the wound-type moisture absorber 268 is arranged inside the inner communication passage PW2 (inside a small diameter part 61d of a housing body 61). Thus, even when moisture outside the battery case 10 (for example, in the atmosphere) permeates the valve body 63 and enters the inner communication passage PW2, the wound-type moisture absorber 268 is able to absorb the permeating moisture. Therefore, in the nonaqueous secondary battery 201 according to the second modified example, moisture permeating the valve body 63 is restrained from entering the battery case 10.

The wound-type moisture absorber 268 arranged inside the inner communication passage PW2 forms a shape that allows gas G inside the battery case 10 to pass inside the inner communication passage PW2 through a gap SP (see FIG. 7) between parts of the wound-type moisture absorber 268, which are adjacent to each other in the radial direction (a direction orthogonal to the winding direction). Therefore, as shown in FIG. 6, gas G inside the battery case 10 is able to pass inside the inner communication passage PW2 through the gap SP in the wound-type moisture absorber 268. Hence, in the nonaqueous secondary battery 201 according to the second modified example, even though the wound-type moisture absorber 268 is arranged inside the inner communication passage PW2, in a case where internal pressure of the battery case 10 reaches the second pressure value, a gas release valve 260 operates (opens) and is able to appropriately discharge gas in the battery case 10 outside through the communication passage PW.

Figure 8:
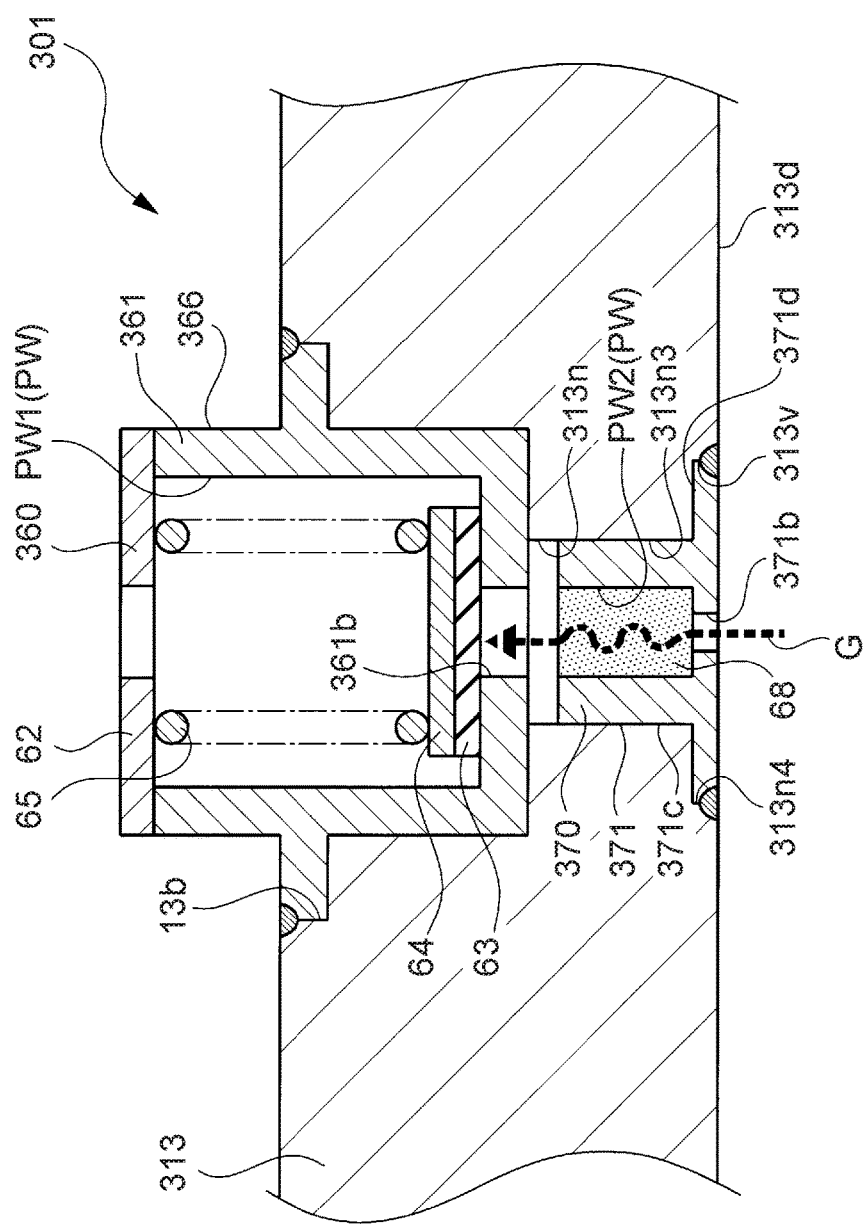
FIG. 8 is a sectional view of a gas release valve and a moisture absorbing structure according to the third modified example.

(Third modified example) Next, the third modified example is explained with reference to the drawings. In a nonaqueous secondary battery 301 according to the third modified example, a shape of a housing of a gas release valve and a method for arranging a porous moisture absorber 68 are different from those of the nonaqueous secondary battery 1 according to the embodiment, and the rest of the parts are the same. Therefore, the parts different from those of the embodiment are explained here. FIG. 8 is a longitudinal sectional view of a gas release valve 360 according to the third modified example.

As shown in FIG. 8, a housing 366 of the gas release valve 360 according to the third modified example has a cylindrical housing body 361 and a disc-shaped (annular-shaped) pressing member 62. The housing body 361 according to the third modified example is different from the housing body 61 according to the embodiment in that there is no portion where a porous moisture absorber 68 is housed (a portion corresponding to the small diameter part 61d of the housing body 61 according to the embodiment). Therefore, in the nonaqueous secondary battery 301 according to the third modified example, a moisture absorbing structure 370 having a porous moisture absorber 68 is arranged separately inside a liquid injection hole 313n, in addition to the gas release valve 360.

The liquid injection hole 313n according to the third modified example has a different shape from that of the liquid injection hole 13n according to the embodiment. Specifically, the liquid injection hole 313n has a form in which a portion of the small diameter part 13n3 of the liquid injection hole 13n according to the embodiment on the side of the inner surface 313d of the lid member 313 is made into a cylindrical hole part 313n4 that has a larger diameter than that of the small diameter part 13n3 (see FIG. 8). Therefore, the liquid injection hole 313n according to the third modified example forms a shape in which the small diameter part 13n3 of the liquid injection hole 13n according to the embodiment is changed into a small diameter part 313n3 and the hole part 313n4.

The moisture absorbing structure 370 is provided with the porous moisture absorber 68 and a holding body 371 that holds the porous moisture absorber 68. The holding body 371 is made from aluminum and has a cylindrical body part 371c, and a rib part 371d provided in an outer peripheral surface of the body part 371c. In a bottom part of the holding body 371, an air vent hole 371b for leading gas G inside a battery case 310 into the moisture absorbing structure 370 is formed. The porous moisture absorber 68 is inserted inside the body part 371c of the holding body 371.

The moisture absorbing structure 370 is arranged inside the inner communication passage PW2 in a form in which the body part 371c is inserted inside the small diameter part 313n3 of the liquid injection hole 313n, and the rib part 371d is also inserted into the hole part 313n4. Then, the rib part 371d of the holding body 371 and a wall part 313v of the lid member 313, which forms the hole part 313n4 of the liquid injection hole 313n, are welded all around (butt welding) by laser welding. In the third modified example, the inner communication passage PW2 is structured from an internal space of the holding body 371, a part of the small diameter part 313n3 of the liquid injection hole 313n, in which the holding body 371 is not arranged (a space above the holding body 371 in FIG. 8), and an air vent hole 361b (a through-hole) formed in a bottom part of the housing body 361.

(Fourth to sixth modified examples) Next, the fourth to sixth modified examples according to the invention are explained with reference to the drawings. In the embodiment, the rib part 61f of the housing body 61, and the wall part 13b of the lid member 13, which forms the large diameter part 13n1 of the liquid injection hole 13n, are butt-welded using laser, thereby welding (joining) the gas release valve 60 to the lid member 13. However, the method for welding the gas release valve 60 to the lid member 13 is not limited to such a method.

Figure 9:
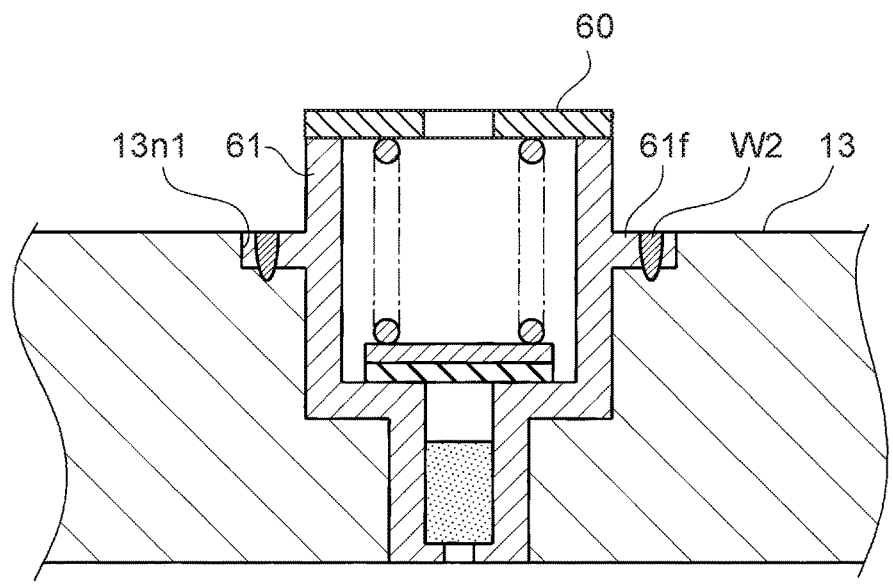
FIG. 9 is a view explaining a structure for mounting a gas release valve according to the fourth modified example.

For example, like the fourth modified example shown in FIG. 9, a rib part 61f of a housing body 61 may be welded to a lid member 13 all around by laser welding (piercing welding) by which the rib part 61f of the housing body 61 is irradiated with a laser beam so that the laser beam penetrates the rib part 61f of the housing body 61 in the thickness direction. In the fourth modified example, a gap between the rib part 61f of the housing body 61 and the lid member 13 is sealed by an annular welded part W2.

Figure 10:
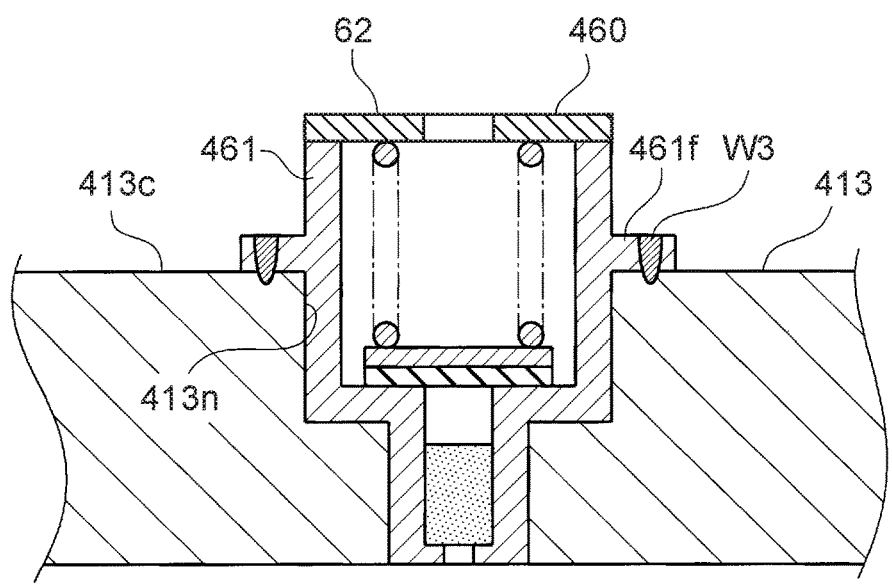
FIG. 10 is a view explaining a structure for mounting a gas release valve according to the fifth modified example.

Further, in the fourth modified example, similarly to the embodiment, the rib part 61f of the housing body 61 is inserted into a large diameter part 13n1 of a liquid injection hole 13n. However, like the fifth modified example shown in FIG. 10, a form may be used, in which a rib part 461f of a housing body 461 of a gas release valve 460 is arranged on an outer surface 413c of a lid member 413 (the rib part 461f is not inserted into a liquid injection hole 413n) without providing a large diameter part in the liquid injection hole 413n. In such a form, similarly to the fourth modified example, the rib part 461f of the housing body 461 may be welded all around to the lid member 413 by laser piercing welding. In the fifth modified example, a gap between the rib part 461f of the housing body 461 and the outer surface 413c of the lid member 413 is sealed by an annular welded part W3.

Figure 11:
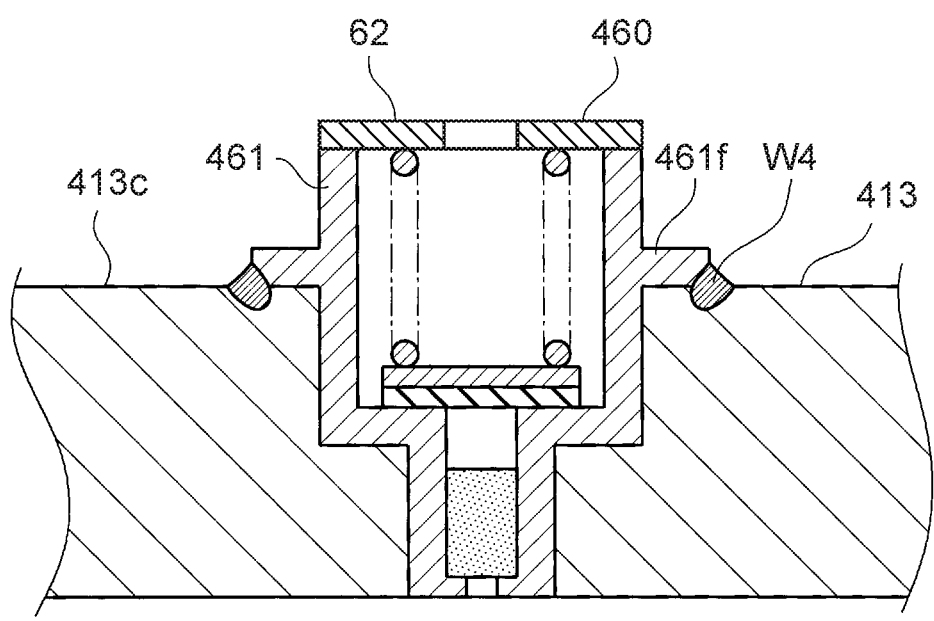
FIG. 11 is a view explaining a structure for mounting a gas release valve according to the sixth modified example.

While using the form where the rib part 461f of the housing body 461 of the gas release valve 460 is arranged on the outer surface 413c of the lid member 413 like the fifth modified example, the rib part 461f of the housing body 461 may be welded all around to the lid member 413 by fillet welding like the sixth modified example shown in FIG. 11. In the sixth modified example, a gap between the rib part 461f of the housing body 461 and the outer surface 413c of the lid member 413 is sealed by an annular welded part W4.

Although the invention has been explained so far based on the embodiment and the first to sixth modified examples, it is needless to say that the invention is not limited to the embodiment and so on stated above, and may be applied with changes made as appropriate without departing from the gist of the invention.

For example, in the embodiment and so on, the rubber-made valve body 63 is used as the valve body of the gas release valve. However, a resin-made valve body may be used. Further, the coil spring 65 is used as a member for bringing the valve body 63 into a close contact with the bottom part 61h of the large diameter part 61c of the housing body 61. However, any elastic body may be used as long as it is an elastic body such as rubber that is elastically deformable.

As shown in FIG. 3, the embodiment describes the form in which the valve body 63 and the valve body pressing plate 64 are pressed by the coil spring 65 so that the valve body 63 closes the communication passage PW. However, a form may be used, in which the communication passage PW is closed only by the valve body. Specifically, for example, a cylindrical rubber-made valve body may be used, which has a natural length larger than a distance (height) from the bottom part 61h of the large diameter part 61c of the housing body 61 to the pressing member 62, and the valve body may be arranged inside the large diameter part 61c of the housing body 61 in a state of being elastically compressed. However, the position of the air vent hole 62b of the pressing member 62 needs to be changed to a position so that the air vent hole 62b is not closed by the valve body.

Further, in the embodiment, the columnar porous moisture absorber 68 is used as a moisture absorber. However, in order to further improve permeability of gas G inside the battery case 10, a porous moisture absorber may be used, in which a cylindrical through-hole (an air vent hole) extending in the axis direction is formed at a position of the central axis of the porous moisture absorber 68.

Furthermore, the shape of the moisture absorber is columnar in the embodiment, is granular in the first modified example, and is a wound shape in which a sheet-shaped moisture absorber is wound in the second modified example. However, the shape of the moisture absorber is not limited to them. Any shape may be used as long as gas inside a battery case is able to pass inside the inner communication passage PW2 in a state where the moisture absorber is arranged inside the inner communication passage PW2.

What is claimed is:

1. A nonaqueous secondary battery comprising:
   an electrode body having a positive electrode and a negative electrode;
   a battery case housing the electrode body;
   a safety valve provided in a wall part of the battery case, the safety valve tearing open when internal pressure of the battery case is a first pressure value or larger and releasing gas in the battery case outside;
   only one liquid-injection hole configured to inject non-aqueous electrolytic solution into the battery case; and
   a spring-based gas release valve disposed in the liquid-injection hole and configured to close the liquid-injection hole, wherein the spring-based gas valve includes a housing that forms a communication passage between an outside and an inside of the battery case, a valve body disposed in the communication passage and that is made from rubber or resin, and a moisture absorber that is arranged inside the communication passage in a state where gas in the battery case is able to pass inside the communication passage, the moisture absorber being positioned between the valve body and the inside of the battery case, wherein
   the gas release valve is configured to:

(i) maintain the communication passage in a state of being closed by the valve body when internal pressure of the battery case is smaller than a second pressure value that is smaller than the first pressure value,
(ii) release the state where the communication passage is closed by the valve body and discharges gas in the battery case outside through the communication passage when internal pressure of the battery case becomes the second pressure value or larger, and
(iii) allow the communication passage to be closed by the valve body again when internal pressure of the battery case becomes smaller than the second pressure value thereafter;
wherein, prior to the internal pressure being equal to or greater than the first pressure, the safety valve is configured to be closed when the internal pressure of the battery case is equal to or greater than the second pressure value and smaller than the first pressure value.

2. The nonaqueous secondary battery according to claim 1, wherein
the gas release valve is inserted into the liquid injection hole extending through the wall part of the battery case, and closes the liquid injection hole.

3. The nonaqueous secondary battery according to claim 1, wherein
at least a part of the moisture absorber is a porous body.

4. The nonaqueous secondary battery according to claim 1, wherein
at least a part of the moisture absorber is a plurality of granule moisture absorbers.

5. The nonaqueous secondary battery according to claim 1, wherein
at least a part of the moisture absorber is a moisture absorber in which a sheet-shaped moisture absorber is wound.

6. The nonaqueous secondary battery according to claim 1, wherein the safety valve is located on a different position in the wall portion from a position on which the gas release valve is located.

* * * * *